Inventors
Howard B. Tuthill
Harry F. Caldwell
By Liverance & Van Antwerp
Attorneys

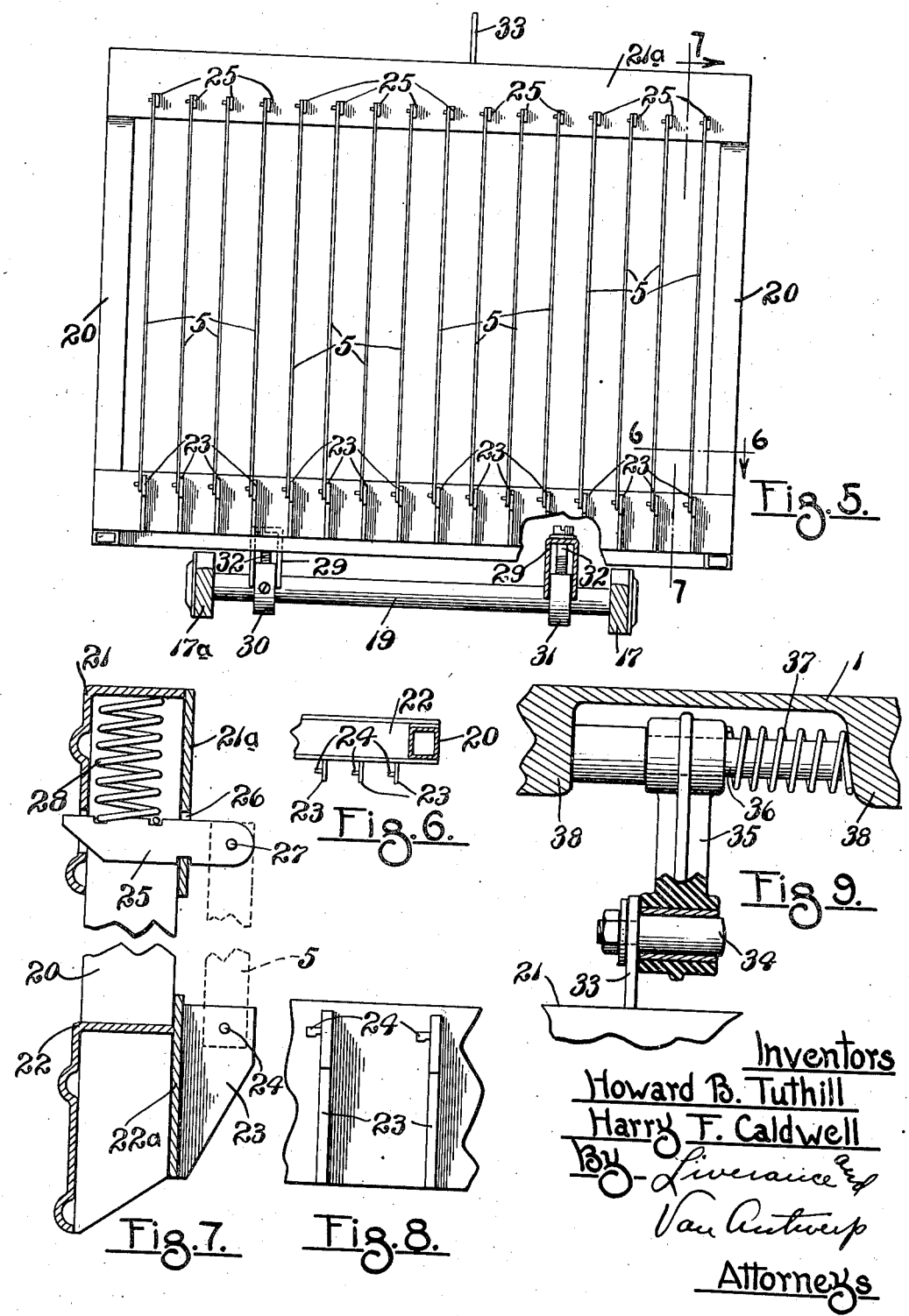

Patented Oct. 12, 1937

2,095,620

UNITED STATES PATENT OFFICE 2,095,620

BREAD SLICING MACHINE

Howard B. Tuthill and Harry F. Caldwell, Grand Rapids, Mich., assignors to Oliver Machinery Company, Grand Rapids, Mich., a corporation of Michigan Application August 6, 1934, Serial No. 738,622

4 Claims. (Cl. 146—153)

This invention relates to bread slicing machines. It is an object and purpose of the present invention to provide a very practical and commercial machine for slicing loaves of bread throughout their entire lengths each into a plurality of slices, and to provide the machine with many novel constructions, combinations and cooperative arrangements of parts for effectively attaining the slicing of all types and characters of bread. More specifically it is an object and purpose of the invention to provide novel slicing mechanism, novel mountings for frames holding the slicing blades, and a novel manner of guide maintenance of the blades in proper position against vibration and twist or warp while in operation and wherein the guides may be readily adjusted for different thicknesses of blades or for the purpose of compensating for any wear of the blades upon the guides.

The various novel and useful feaures of construction and the results obtained therefrom may be understood from the following description, taken in connection with the accompanying drawings, in which, Fig. 1 is a vertical section through one form of the bread slicing machine.

Fig. 5 is a substantially vertical elevation of the frame for the slicing blades and showing the manner in which it is supported at its lower end.

Fig. 6 is a fragmentary horizontal section on the plane of line 6—6 of Fig. 5.

Fig. 7 is a fragmentary enlarged vertical section on the plane of line 7—7 of Fig. 5.

Fig. 8 is a fragmentary side elevation of the lower part of the frame shown in Fig. 7, and Fig. 9 is a fragmentary, somewhat enlarged section, substantially on the plane of line 9—9 of Fig. 1.

Like reference characters refer to like parts in the different figures of the drawings.

Figure 1:
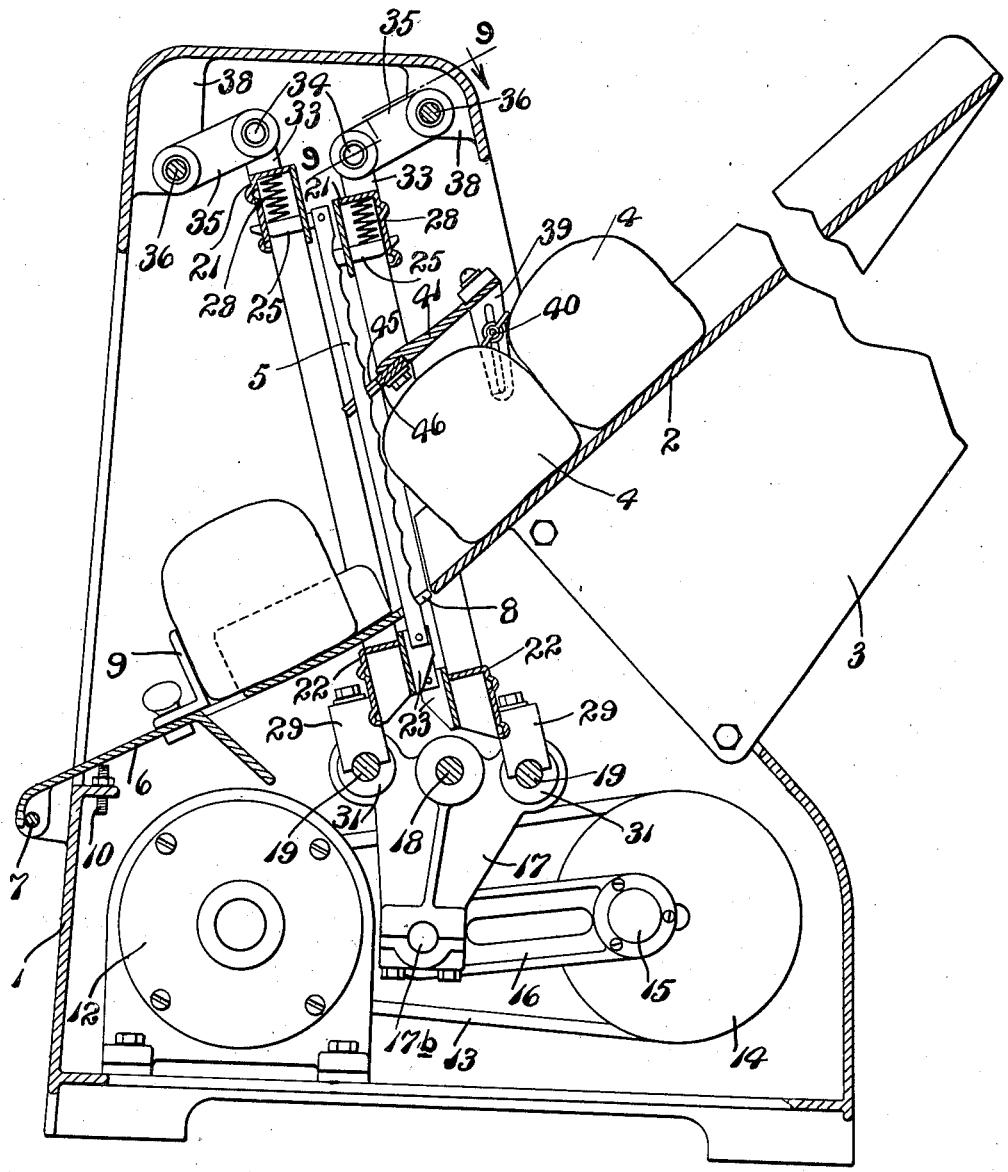

In the construction of the machine as shown in Fig. 1 a supporting housing, generally indicated at 1, is used which is open through from one side to the other. An inclined chute 2 is mounted, by means of brackets 3, at an open side of the housing, down which the loaves of bread 4 move by gravity to the slicing blades or knives 5. A receiving table 6 is located at and extends into the housing at the opposite open side and is pivotally mounted at its outer end as indicated at 7. At its edge where it approaches the adjacent edge of the chute 2 a number of slots 8 are cut through which the blades 5 pass. Such slots 8 are not essential and both the slots and the fingers between the slots may be dispensed with. The receiving table 6 is provided with a stop 9 against which the sliced loaf, after it has passed the blades, comes to rest whereupon the operator may remove the sliced loaf to make place for a succeeding loaf.

Figure 2:
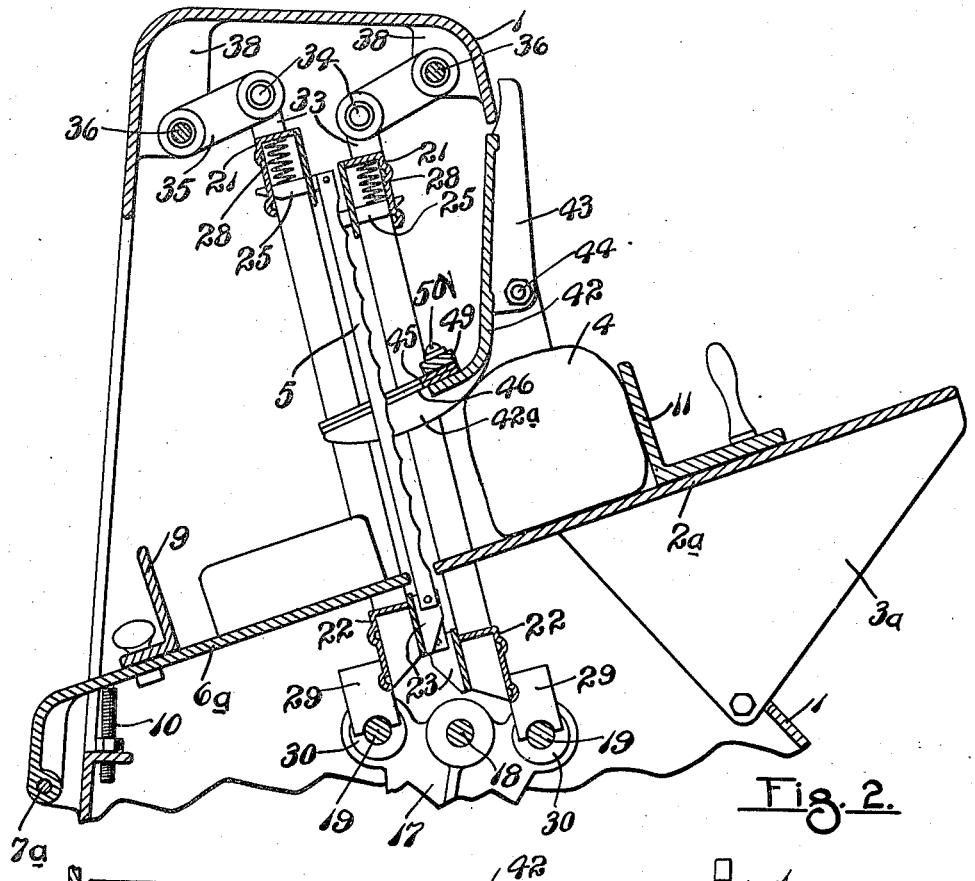
Fig. 2 is a fragmentary like section through the upper part of another form of the machine.
Figure 3:
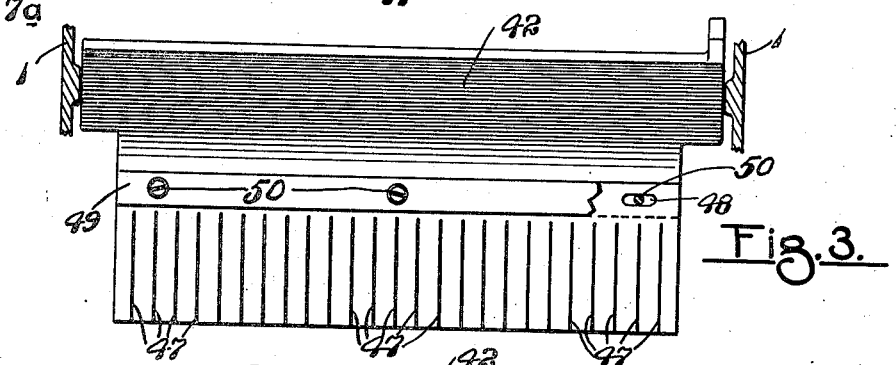
Fig. 3 is a plan view of one form of mounting the blade guide, that shown in Fig. 2.

In Fig. 2 in the other form of the construction the table or chute 2a over which the loaves of bread pass is at a less inclination to the vertical and is mounted by means of brackets 3a. At its inner edge it approaches the blades 5. The receiving table 6a is pivotally mounted at 7a and has a stop 9. The receiving table 6a at its inner edge approaches but stops short of the slicing blades 5. The table 6 or 6a is adjusted to position by adjusting screws 10 as shown. In the second form of the bread slicing machine the loaf of bread is forced by pressure against its outer side to the blades using a suitable pressing member 11 of angle form which has a handle to be grasped as shown in Fig. 2.

The blades 5 are mounted on suitable frames, as will be hereafter described. Said frames are designed to have up and down reciprocatory movements. An electric motor 12 drives a belt 13 which, in turn, rotates a disk 14 having an off-center stud 15, connected with which is one end of a connecting rod 16. A rocker member 17 mounted on a fixed cross rod or shaft 18, which at its ends is carried by the sides of the housing 1, has a pivotal connection 17b with the other end of the connecting rod 16. There is a companion rocking member 17a spaced from the rocker arm 17 on shaft 18. Between the two members 17 and 17a, at opposite sides of the shaft 18, are revolubly mounted rods 19 parallel to each other and to the shaft 18 whereby on rotation of the disk 14 the rods 19 are oscillatably rocked and bodily moved back and forth about the axis of the shaft 18.

Associated with each of the rods 19 is a frame for carrying the blades 5. The frame is of rectangular shape having substantially vertical sides 20 connected at their upper ends by a cross bar 21 of angle shape having a top and one side made from an integral plate of metal and with a plate 21a secured in place to complete an upper bar of substantially inverted channel form (see Fig. 7). At their lower ends the vertical sides 20 of the frame are connected by a like horizontal bar structure, including an angle bar 22 with a side 22a attached thereto, thus providing a second inverted channel shaped bar form for the lower side of the frame. Plates 23 in equally spaced apart relation are secured to and extend outwardly from the plate 22a, each carrying a laterally disposed pin 24 over which the lower end of a blade 5 may be hooked. In the upper horizontal member of the blade carrying frame, a like plurality of levers 25 are inserted through openings or slots 26 cut in the face 21a and the upper ends of the blades are hooked over laterally extending pins 27 on the levers 25. Coiled compression springs 28, one for each lever 25, are housed within the upper channel-like horizontal cross frame member, the tendency of which is to turn the inner end portions of the bars downwardly and thus impart tension to the blades.

At two spaced apart points on the lower horizontal frame member, inverted U-shaped stirrups 29 are secured the legs of which at their lower ends are formed with concaved recesses to fit over and bear against their associated rod 19. Collars 30 and 31 are mounted on each rod 19, the collars 30 being secured to the rods by set screws and the collars 31 being loose upon said rods. Screws 32 pass through the U-shaped members 29 and are threaded into the collars 30 and 31, the legs of the members 29 embracing opposite sides of said collars (see Fig. 5). It is, of course, to be understood that in the machine there are two of the frames and that each of said frames is mounted at its lower end on one of the rods 19 as described and that the frames extend upwardly in substantial parallelism to each other, and with the blades 5 carried by the two frames lying side by side, and that with the rocking movements about the shaft 18 one series of blades is elevated while the other is moved downwardly and vice versa.

A tongue 33 is secured to and extends upwardly from each of the upper horizontal cross members of said blade carrying frames and has a horizontal stud 34 (Fig. 9) at its upper end which passes through a suitable metal journal in one end of a rubber link 35, the opposite end of which is journaled upon a reduced portion of a shaft 36. A coiled compression spring 37 is located around the reduced portion of the shaft and moves the link 35 over against a shoulder at the enlarged portion of the shaft as shown in Fig. 9. This provides a quickly detachable connection of links 35 from the blade frames. The shafts 36 are mounted on and between suitable spaced apart lugs 38 at the upper portion and at the inner sides of the housing 1.

With this construction there is one positively fixed point only with reference to which a frame is mounted, namely, the fixed collar 30 on the shaft 19. The collar 31 on the same shaft is free to adjust itself relative to the member 29 and to the fixed collar 30 and the rubber links 35 being of a yielding flexible nature, there is no rigidity of mounting such as to cause any binding action in the movements of the frames carrying the knife blades in their vertical reciprocations.

In both forms of machines, shown in Figs. 1 and 2, the blades are provided with stabilizing guides above the upper sides of the loaves of bread as they pass to the cutting blades. In Fig. 1 brackets 39, vertically slotted, are adjustably mounted by means of binding nuts 40 on the sides of the housing 1 and carry a transverse horizontal supporting bar 41 which extends downwardly and inwardly toward the blades 5 but stops short of said blades. In the construction shown in Fig. 2 a cross member 42 is pivotally mounted by means of wings 43 at 44 on the sides of the housing 1, and is provided with downwardly and inwardly extending fingers 45 which pass between alternate blades 5. The bars 41 and 42 are used to support the immediate blade guiding members 45 and 46. Said guiding members 45 and 46 are identical in construction, having slots 47 cut inwardly from one outer free edge, which slots are wider than the thickness of the blades 5. The slots do not extend entirely through the guide members 45 and 46. In the non-slotted portion of the guide members 45 and 46 slightly elongated slots 48 are cut at spaced apart intervals.

Figure 4:
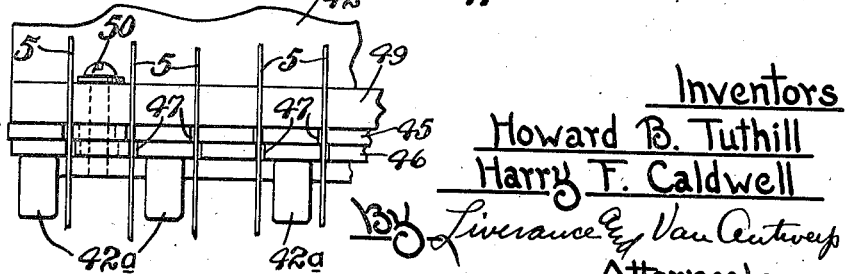
Fig. 4 is a fragmentary enlarged front elevation thereof.

In mounting the blade guides on the cross member 42 the two guide members 45 and 46, which are of a comb-like structure, are disposed one over the other with the slots 48 in conjunction. A bar 49 is placed over the uncut portion of the members 46 and 45 and bolts 50 pass through the bar 49, the slots 48 and through the adjacent edge portion of the member 42, the slotted portions of said members extending over the fingers 42a. In the structure shown in Fig. 1 the two guide members 45 and 46 are similarly connected at the inwardly extending edge portion of the bar 41 and extend downwardly and inwardly therefrom. In both cases the blades pass through the slots 47 of the members 45 and 46. Said slots being wider than the blades, the two members 45 and 46 are adjusted with respect to each other so that a blade bears against one side of a slot 47 in the member 45 and against the opposite side of the slot 47 in the lower member 46, as shown in Fig. 4. It is evident that with this structure the two members of the blade guide structure which are directly in conjunction with the blades may be readily adjusted to correspond to the thickness of blades used, and that they may also be adjusted when needed to compensate for any wear which takes place against the sides of the slots by reason of the reciprocatory movements of the blades.

The material from which the guide members 45 and 46 is made preferably is fiberboard. But they are not in any sense restricted to any particular type of material.

With the structure shown in Fig. 1 the guides for the blades are always located slightly above the uppermost portions of the bread loaves 4 and the loaves pass freely underneath the same. With different sizes of loaves the guides may be adjusted to different positions so as to lie close to but out of contact with the bread that passes beneath. In the structure shown in Fig. 2 the loaves of bread are pushed underneath the curved edges of the fingers 42a necessitating a lifting movement of the blade guides. The supporting member for the guides rides over the upper surfaces of the loaves of bread and serves to hold the same against any tendency to jerk upwardly under the movement of the blades or otherwise move in any undesired fashion. This is desirable particularly with certain kinds of bread.

With the structures described the frame carrying the blades is mounted in a fixed relation to the rod 19 which supports it. The recesses in the ends of the legs of the stirrups are carefully formed so that when the blade carrying frame is mounted on the rod, the planes of the blades are positioned exactly at right angles to the axis of the rod and in their reciprocating movements do not move laterally out of said planes. This is an important consideration in the construction of bread slicing machines, insuring that the blades will have no lateral or sidewise movement which would disturb the even slicing of the bread loaves. The connection by means of the flexible links at the upper ends of the blade carrying frames places no stress on the frames so as to shift or otherwise move the same laterally, and the fixed rigid mounting of the blade carrying frames on their supporting rods which are parallel to the rock shaft is in no way affected or disturbed by such flexible link connection.

With this construction also the tension springs used to keep the blades tensioned affect only the individual blades with which they are associated, and do not operate to warp or twist the frame and thus disturb the accurate positioning of other blades. All blades move perfectly up and down in vertical planes. The structure is one which provides an easy connection of the blades in the first instance or for detachment and replacing thereof, it being merely necessary to move a lever upwardly against its associated tension spring whereupon the associated blade may be disconnected.

The structure also permits any necessary close spacing of the blades for cutting slices of a desired narrow width. The slots through which the tensioning levers pass are narrow, the levers are substantially one-eighth of an inch thick only, and the slots can be punched close together so as to provide any desired narrow spacing of the blades to thereby slice the bread to the thinnest slices which may be desired. The construction described is therefore one of a very practical, yet simple form. The positioning of the guides of the blades, the adjustment of the guides in the structure shown in Fig. 1, and the bearing of the guide support in the structure shown in Fig. 2, all insure that in no case will the guides for the blades ever be any more than a very short distance above the upper side of the bread loaves. In the structure shown in Fig. 2 the weight of the guide support holds the loaves against upward movement, and in the structure shown in Fig. 1 any upward movement of the loaves of bread must be of an exceedingly limited character because of striking against the blade guides or their support upon a very slight upward movement. These constructions of bread slicing machines have proven their merit in commercial manufacture and the same have been sold to a large extent.

The invention is defined in the appended claims and is to be considered comprehensive of all forms of structure coming within their scope.

We claim:

1. In a bread slicing machine, a shaft, a member mounted thereon to rock about the axis of the shaft, means for rocking said member, a rod carried by said rocking member and spaced a short distance from and parallel to the shaft, a fixed collar on the rod, a loose collar on the rod spaced from the fixed collar, an open frame, inverted U-shaped stirrup members connected to the lower portion of the frame having ends bearing on said rod, the sides of said stirrup members passing at opposite sides of said collars, means securing the stirrup members to the collars, a plurality of spaced apart slicing blades carried by the frame, and a flexible link pivotally connected at one end to the upper end of the frame and pivotally connected at its other end to a fixed support, as and for the purposes specified.

2. In a bread slicing machine, a shaft, a member mounted thereon to rock about the axis of the shaft, means for rocking said member, a rod carried by said rocking member and spaced a short distance from and parallel to the shaft, an open frame, inverted U-shaped stirrup members connected to the lower portion of the frame having ends bearing on said rod, means for preventing movement of said frame along said rod, a plurality of spaced apart slicing blades carried by the frame, and a flexible link pivotally connected at one end to the upper end of the frame and pivotally connected at its other end to a fixed support, as and for the purposes specified.

3. In a slicing machine, reciprocating means moving in an accurately maintained path, an open knife holding frame, means for mounting knives on said frame to extend across the opening therein and for tensioning said knives in said frame, means for rigidly and detachably connecting said knife holding frame at one edge only to said reciprocating means and means connected only with the side of said frame opposite the side attached to the reciprocating means for guiding that side of the frame, said last mentioned means comprising a link yieldable in a direction parallel to the edge of the frame which is mounted upon the reciprocating means.

4. In a bread slicing machine, a shaft, a member mounted thereon to rock about the axis of the shaft, a frame fixed to said member a distance from the shaft, slicing blades mounted in said frame and movable on rocking the shaft in planes at right angles to the axis of the shaft, and a rubber link pivotally connecting the upper end of the frame to a fixed support and operating to stabilize the upper end of the frame in its movements without affecting the rigid connection of the frame to said rocking member and the maintenance of the blades in said planes.

HOWARD B. TUTHILL.
HARRY F. CALDWELL.